United States Patent Office 3,254,985
Patented June 7, 1966

3,254,985
PELLETIZING RELATIVELY COARSE IRON MINERALS
Kenneth E. Merklin, Hibbing, Minn., assignor to Pickands Mather & Co., Cleveland, Ohio, a corporation of Ohio
No Drawing. Filed Mar. 19, 1963, Ser. No. 266,203
4 Claims. (Cl. 75—3)

This invention relates to the preparation of ferruginous ore materials, including concentrates, in form suitable for transport, and is concerned with the working up of such ore material, in which the wanted minerals are present in relatively coarse crystalline form, by a procedure involving pelletizing.

Pelletizing is the process by which concentrates or ore particles are agglomerated into the form of pellets which are sufficiently strong so that they can be shipped and used as feed ore in either the blast furnace or open hearth. This process which came into commercial prominence in the late 1940's has revolutionized blast furnace performance. At the present time the capacity of pelletizing plants in North America is approximately 20 million tons per year. The number of plants now under construction will increase this capacity by 15 million tons annually. The material now being pelletized and which will be pelletized in the plants under construction has invariably been fine concentrates which have resulted from the concentration of fine-grained taconites or like ferruginous material. The value of using pellets is illustrated by data presented by T. F. Olt in his paper, "Blast-Furnace Performance Using Iron Ore Pellets" (1961, Journal of The Iron & Steel Institute). In this article Mr. Olt reported that the production of pig iron from the furnace described in the article more than doubled from the time that pellets were first used on the specific furnace until the charge consisted entirely of pellets.

The great savings made possible in the blast furnace through the use of pellets has resulted in the direct shipping iron ores and coarse concentrates falling into disfavor. The amounts of such ore mined had diminished and penalties have been put on their use because of the greater cost in converting them to pig iron as compared to pellets. The reasons for their poor performance are two-fold. Some of the direct shipping ores are relatively poor in grade with a low iron content and a high silica content. There are, however, considerable amounts of direct shipping iron ore and washed gravity concentrates which have an excellent chemical analysis and whose only disadvantage is their structure. Present practice is to take such ores and screen them into a number of sized increments. The coarser sizes are fed directly to the blast furnace and the finer sizes are sintered. Such practice, although a major improvement over charging the unsized ore into a blast furnace, leaves much to be desired. The coarse size material and the sinter made from the fines are both inferior as a starting material to pellets. It is evident, therefore, that if direct shipping ores of good chemical quality are to be utilized in the future, they must be converted into pellets if they are to become competitive. Heretofore, efforts to pelletize such ores have not been successful. I have now, however, found a new and surprising procedure whereby such ores can be readily converted into pellets of high quality.

All pelletizing plants now in operation wet grind the ore or concentrate to a suitable size consist, dewater using thickeners and/or vacuum filters, then ball and indurate the filter cake. Many investigators have tried this procedure on the earthy ores—e.g., earthy hematites, limonites and goethites—with very indifferent success. Difficulties arise with this procedure, starting with the thickening of the wet ground material. Because of the colloidal nature of such ores, the material is difficult to thicken, and the thickener overflows are highly colored and are a major nuisance from a disposal standpoint. Some iron losses also result. On account of the colloidal nature of the ore, the thickened product is very difficult to filter, filtration rates are low, large numbers of filters are required and the resulting moisture content of the filter cake is excessive for satisfactory ball formation. Our experience has been that a filter cake, made from the wet grinding of Michigan underground ores, will contain more than 12% moisture. When an attempt is made to ball such a high moisture filter cake by any of the known conventional procedures, difficulties develop. The first of these difficulties is that because of the nature of the material, many seed balls are formed which will not grow to a suitable size, as individual balls, unless the moisture content is increased over and above the normal content. The high moisture content results in producing loose aggregations of these seed balls. This resultant product is very poor in character: The material is not properly compacted, and the shaped material is so plastic that it loses its identity in being transported to the pelletizing furnace or when subjected to any compression load. When pelletizing, the heat consumption is high because of the high moisture content, thermal shock on induration becomes a major problem since the greater quantity of internal vapor gases formed from the moisture have difficulty in escaping rapidly. Indurating problems and poor pellet quality are also encountered since the starting green balls are not properly compacted and frequently greatly distorted in shape.

To offset these difficulties I have discovered a new means of ore preparation which obviates these difficulties. My basic invention consists essentially in a combination of two operative steps. The first step involves a particular mode of grinding the ore prior to pelletizing, and the second step includes a particular procedure for adding moisture to the material so ground, whilst balling the material, which balling procedure differs from any previous process.

Relative to the grinding process, I prefer to take the natural ore and give it an initial crushing treatment so that the coarsest size may be as large as 12 inches and then take this coarsely crushed product and, without any further preparation, grind it dry in an autogenous mill. To practice dry autogenous grinding, it is necessary that the ore be dried to less than about 4% moisture. There is no exact moisture limitation that applies to all ores, and the maximum moisture allowable varies considerably from ore to ore.

Since most direct shipping ores or concentrated ores of this nature contain in the order of 8% to 14% moisture, it is necessary to supply some heat to the autogenous mill in the form of hot air, this hot air serving a dual purpose in that it dries the ore and at the same time acts as a classifying medium which removes from the mill particles that have reached the desired state of fineness. Autogenous mills are now in common use in both dry and wet grinding of various types of ore, and an example of the type operable for use in my process is that described in "Theoretical Concepts of the Aerofall Mill With Illustrations of Plant Practice" by Major D. Weston (Proceedings International Mineral Processing Congress, 1960). The term "autogenous grinding" comes from the fact that coarse pieces of the ore itself furnish the grinding medium.

In my process the extent or degree to which the ore is ground to make good balls varies, depending on the ore. However, in all instances the ore need not be ground to the degree normally needed for pelletizing magnetite or specularite concentrates. In pelletizing magnetite and specularite concentrates it is usually essential that the material be all finer than about 65 mesh with at least 60% of the material finer than 325 mesh. Because of the amount of colloidal material in most direct shipping ores, it is usually not necessary to grind to anywhere near this degree to produce material that will ball readily. Frequently such material can be ground so that it need pass only a 6 mesh screen and the amount of minus 325 mesh may be no more than 40%. After the material has been ground it is then ready for pelletizing.

Although the preferred method for accomplishing the dry grinding step is by use of a dry autogenous mill, the process is not limited solely to the use of this type of mill. Several variations are possible. For some ores it may be desirable to grind the ore only partially in the autogenous mill, say to 20 mesh and then complete the fine grinding operation in a standard dry ball mill or pebble mill. It is also entirely feasible in preparing iron ore for pelletizing, particularly in preparing iron ore concentrates for pelletizing, to carry on the dry grinding step in rod, ball, or tube mills. If the starting material is a gravity concentrate from a process such as the float-sink, cyclone or spiral process, the concentrate may be of such a size that it can be effectively ground by one of the conventional grinding units mentioned above.

The type of material determines how fine it should be ground and also determines what the proper size distribution should be. With some ores it is only necessary to grind the material to 6 mesh to enable good balls and pellets to be produced. With other ores if grinding to this size were practiced, the relatively large amount of material in the size range from 6 to 35 mesh would cause an excessive amount of seed pellets. So many seed pellets may be formed that there is not enough fine material available to allow the pellets to grow to the desired size. On such materials it may be necessary to grind the product so that essentially all will pass a screen as fine as 48 mesh.

The second novel portion of my invention has to do with the manner in which moisture is added to the essentially dry ground product. If such moisture for balling is added ahead of the balling drum or in the balling drum, with this type of ore a mass of tiny "seed balls" or nuclei, usually smaller than ¼", is formed. These seed balls grow only by adhering to other seed balls to form a loose aggregation that is not suitable for further treatment. I have found that by adding only sufficient water for dust control to the new feed and adding the major portion of the water required for balling to the seed pellets as they are recirculated outside of the balling drum, an excellent ball can be formed. My experience has been that moisture in the amounts of up to 4 and in some cases 6% can be added ahead of the balling drum. This initially added moisture is best added ahead of a mixing device such as a "Pekay" mixer to insure that the moisture is homogeneously mixed. This amount of moisture will vary from ore to ore but must be below the level required for any seed ball formation. In my process this slightly moistened concentrate is added to the balling drum. In starting up the balling drum some moisture may be added to the balling drum. However, after the operation has come into balance, only a very small amount of water or none at all is added at this point. No appreciable amount of moisture is added in the drum. After the circuit has built up to a normal operating condition, the only moisture added is that which is added to the undersize seed balls from the trommel or vibrating screen at the end of the balling drum. The moisture is added in such a manner and at such a place that the surface of the undersize balls is thoroughly wetted. This moisture is preferably added in the form of a fine mist. When these wetted small balls are charged back into the feed end of the balling drum, the essentially dry fine new feed will adhere as a coating to the wet surfaces of the returned seed balls. Only a relatively thin layer of new feed will be picked up on the surface of the seed ball. For a green or undesized ball to attain the desired size, it may be necessary for it to make possibly three or four passages through the drum. The secret of the operation is to add the moisture in relatively small amounts and to build up the ball in relatively thin layers which can be adequately compacted in the passage of the ball through the drum.

This process is also applicable to other types of balling equipment now in use, such as the balling cone or balling disc. In these types of equipment no outside circulating load of seed balls is involved. There is, however, a tendency for the seed balls to segregate by size into certain areas of the equipment. By adding a fine water mist on these seeds, away from the area of new feed addition, results similar to those obtained with the balling drum system can be achieved.

EXAMPLE NO. 1

On the Gogebic Iron Range of northern Michigan and Wisconsin a relatively high quality iron ore is mined from underground properties. This ore has a good chemical analysis, but, like most direct shipping ores, its structure is a handicap to good blast furnace utilization. The ores are by nature rather sticky, usually containing from 9% to 13% moisture and are almost impossible to screen without some preliminary drying. Attempts to grind the ore wet and then pelletize resulted in the difficulties mentioned in the foregoing paragraphs. Under the new procedure that I have devised, a large sample of ore from the Mauthe Mine at Ironwood, Michigan, was secured. The chemical analysis of this ore in its natural state, and the analysis of the pellets produced by the described process, are as follows:

|  | Chemical Analysis | |
|---|---|---|
|  | Natural Ore | Pelletized Product |
| Iron | 54.75 | 61.68 |
| Silica | 8.00 | 9.01 |
| Phos | .060 | .067 |
| Alumina | 1.41 | 1.59 |
| Lime | .40 | 2.40 |
| Ign. Loss | 1.25 |  |
| Moisture | 10.00 |  |

From the above it may be seen that pelletizing this material improves its chemical quality as well as its structure.

At this mine, material coarser than 2" is poor in grade and is discarded. The sample which was representative of the material shipped, had the following sizing analysis:

*Table No. 1*

MAUTHE ORE—WET STRUCTURE ANALYSIS

| Size | Percent Weight | Accum. Percent Wt. |
|---|---|---|
| +1½" | 3.55 | 3.55 |
| +1" | 5.36 | 8.91 |
| +¾" | 5.52 | 14.43 |
| +½" | 8.05 | 22.48 |
| +¼" | 9.07 | 31.55 |
| +3 Mesh | 8.01 | 39.56 |
| +6 Mesh | 11.66 | 51.22 |
| −6 Mesh | 48.78 | 100.00 |
|  | 100.00 |  |

This ore, which had a 10% moisture content, was fed into an autogenous grinding mill. Because of the absence of pieces of ore material coarser than 2", a number of 6" steel grinding balls were added to the charge. This Aerofall mill was swept with hot air, and the amount of air was adjusted so as to control the size of the material removed from the mill. The air was heated to the degree necessary to reduce the moisture in the ore charge to about 2%. It was found that suitable green balls could be formed through a considerable range of the sizing analysis of the material discharged from the Aerofall mill. Given below are sizing analysis showing typical grinds which yielded pellets of acceptable quality.

Table No. 2

MAUTHE ORE FINES—SCREEN ANALYSIS OF TYPICAL AUTOGENOUS MILL PRODUCTS

| Mesh Size | Grind #1 | Percent Wt. Cumulative | |
|---|---|---|---|
| | | Grind #2 | Grind #3 |
| +3 | | | |
| +4 | 6.0 | 3.2 | 2.5 |
| +6 | 10.5 | 7.4 | 4.5 |
| +8 | 14.0 | 9.5 | 5.5 |
| +10 | 16.1 | 10.7 | 6.0 |
| +14 | 17.2 | 11.6 | 6.2 |
| +20 | 18.2 | 12.2 | 6.3 |
| +28 | 19.4 | 12.4 | 6.4 |
| +35 | 21.4 | 12.9 | 6.5 |
| +48 | 25.6 | 14.0 | 6.7 |
| +65 | 31.9 | 17.0 | 7.8 |
| +100 | 39.0 | 21.9 | 11.7 |
| +150 | 45.3 | 30.8 | 19.2 |
| +200 | 50.8 | 38.3 | 27.1 |
| +325 | 57.0 | 47.1 | 37.1 |
| −325 | 43.0 | 52.9 | 62.9 |

For comparative purposes a sizing analysis of a typical ground taconite concentrate is shown as Table No. 3.

Table No. 3

| Screen Analysis—Mesh | Typical Taconite Concentrate | |
|---|---|---|
| | Percent Wt. | Percent Cum. Wt. |
| +100 | .90 | .90 |
| +150 | 1.72 | 2.62 |
| +200 | 2.77 | 5.39 |
| +325 | 9.92 | 15.31 |
| −325 | 84.69 | 100.00 |
| | 100.00 | |

It will be noted that this taconite concentrate contains much more minus 325 mesh material than does the Gogebic ore. However, the difference in the total surfaces of two materials is not too great because of the colloidal material in the Gogebic ore.

To the relatively dry ground Gogebic ore which contained 2% moisture was added an additional 2% of moisture and this was thoroughly mixed with the ore prior to feeding a balling drum provided with a ⅜″ trommel. At the start of the balling operation enough water was sprayed onto the new feed to cause some seed balls to form. At the start of the operation only seed balls were formed. These passed through the interstices of the trommel, at the discharge end of the balling drum, and were returned to the feed end of the drum. These seed balls as they were thus transported were sprayed with a fine water mist which wetted the ball surfaces. When these wetted balls re-entered the drum, the new, fine slightly moistened ore fines immeditaely formed a coating on the wetted surfaces. The balls thus grew in diameter and after a few passes through the circuit, reached the desired size and passed over the trommel. When the circuit had reached a balance practically all of the water was added to the seeds on the return conveyor belt.

Green balls from the three types of grind reported in Table No. 2 were made, and these were tested in the green state and were later fired in a batch pelletizing furnace giving the properties which are reported in Table No. 4.

Table No. 4

PROPERTIES OF MAUTHE PELLETS IN UNFIRED AND FIRED STATE

| Material | Ball Moist., percent | Unfired Balls, Compressive Strength | | | Fired Pellets, Std. Tumble Test 3 m. after Tumble [4] |
|---|---|---|---|---|---|
| | | Green Drop No.[1] | Green,[2] lbs. | Dry,[3] lbs. | |
| Grind #1, 43%−325 m | 10.9 | +50 | 3.4 | 8.2 | 87.3 |
| Grind #2, 52.9−325 m | 11.1 | +50 | 4.5 | 10.4 | 95.5 |
| Grind #3, 62.9−325 m | 11.9 | +50 | 6.0 | 14.9 | 98.1 |

[1] Number of times a green ball can be dropped a distance of 18″ without breaking.
[2] Compressive strength of −½″ +15/32″ ball, natural or undried state.
[3] Compressive strength of −½″ +15/32″ ball, dried at 230° F. for 4 hours.
[4] Standard Tumble Test, 25 lbs. screened sample of fired pellers tumbled 200 rev.; percentage weight of sample, after test, remaining on a 3-mesh Tyler standard screen.

With this type of procedure superior green balls and fired pellets were made whereas it was impossible to produce a satisfactory product by wet grinding and filtering the starting material in accordance with the normally accepted procedure.

EXAMPLE 2

The Mesabi Range in Minnesota has in the past been the major supplier of iron ores in the U.S. Much of this ore formerly was sufficiently high grade so that it could be loaded directly at open pit mines into railroad cars, transported to the steel plants and there used in its natural condition. With increased demand for better quality ores both from the standpoint of chemistry and from structural qualities most Mesabi ores are now subjected to sizing and concentration before shipment. The common concentration processes are washing followed by the use of such gravity concentration methods as float-sink, jigging, hydro-cyclones and spirals. Such concentrates usually are shipped as a coarse product larger than ¼″ and a fine fraction smaller than ¼″. The coarse portion is then usually charged directly into the blast furnace. The fines are now normally sintered prior to use.

These procedures are far superior to those of charging un-sized ore into the blast furnace. However, the blast furnace performance on either the sized coarse ore or on the sintered fines is inferior to the results that can be secured if the entire ore is pelletized.

Sized and concentrated earthy ores of the type mentioned above can also be materially benefited by the newly described procedure for grinding, balling and indurating such ores. Typical of such an ore is that produced at the Mahoning Mine near Hibbing, Minnesota. At this property the mined ore is crushed to approximately 2½". The ore is washed on a ¼" screen. The coarse fraction can be either shipped directly or if the ore contains somewhat more silica than is desirable it can be further beneficiated by the use of the float-sink procedure. The ¼" fines are treated in a spiral type of classifier where the extreme fines which tend to be silicious are rejected. The product from the classifier is de-watered and shipped as a separate product. In steel plants these fines (classifier product) are sintered before use.

I have carried on experimental work to determine if this material could not be ground, balled and indurated by exactly the same process as illustrated in Example 1. Typical sizing analyses of the coarse and fine product together with the chemical analysis of the individual product are shown in Table No. 5. An inspection of the chemical analysis shows that the iron and silica contents of both ore fractions are excellent.

*Table No. 5*

WET SIZING ANALYSIS

| Size | Mahoning Coarse and Fine Concentrates | | | |
|---|---|---|---|---|
| | Coarse | | Fines | |
| | Percent Wt. | Cum. percent Wt. | Percent Wt. | Cum. percent Wt. |
| +1½ | 2.29 | | | |
| +1" | 8.15 | 10.44 | | |
| +¾ | 14.60 | 25.04 | | |
| +½ | 16.23 | 41.27 | | |
| +⅜ | 15.36 | 56.63 | | |
| +3 Mesh | 10.89 | 67.52 | .40 | |
| +6 Mesh | 17.29 | 84.81 | 14.81 | 15.21 |
| +10 Mesh | 5.40 | 90.21 | 14.40 | 29.61 |
| +28 | | | 15.03 | 44.64 |
| +48 | | | 18.77 | 63.41 |
| +100 | 9.79 | 100.00 | 16.77 | 80.18 |
| −100 | | | 19.82 | 100.00 |
| | 100.00 | | 100.00 | |

| | Chemical Analysis (Dry) | |
|---|---|---|
| | Coarse Conc. | Fine Conc. |
| Percent Iron | 58.54 | 58.94 |
| Percent Phos | .064 | .061 |
| Percent Silica | 6.86 | 6.99 |

The coarse and fine portions of the concentrate were mixed back together in the same proportion that they were produced and were dry ground in an autogenous mill. Since there was no coarse material in the starting ore, a number of 6" steel balls were used to facilitate grinding. After numerous trials it was found that if this ore was ground to an extent where all of it was finer than 28 mesh and contained approximately 50% of material finer than 325 mesh, good quantity products could be produced. With this starting material, because a proportion of colloidal fines had been washed out in the concentrating step, it was found possible to produce a ball with good properties at a moisture of 8.5%.

I show in Table No. 6 the properties of these green balls and also the properties of the fired pellets as measured by the tumble test after firing to a temperature of 2450° F. in a batch pelletizing furnace which simulated the performance of a traveling grate.

*Table No. 6*

PROPERTIES OF MAHONING PELLETS—UNFIRED AND FIRED STATE

| Ball Moisture | Green Drop No. | Compressive Strength, lbs. | | Fired Pellets Std. Tumble Test 3 m. After Tumble, percent |
|---|---|---|---|---|
| | | Green | Dry | |
| 8.5 | 36 | 4.2 | 10.5 | 95.1 |

NOTE.—See Table No. 4 footnote for test evaluation.

The character of the green balls produced by this grinding procedure and by adding moisture in incremental amounts to the undersized seed balls from the trommel which were being returned to the feed end of the balling drum was such that the balls so formed were sufficiently strong so that they could be readily transported to the pelletizing device without breakage. The moisture content (8.5%) was sufficiently low that the balls were not unduly plastic and did not deform materially in charging into the pelletizing device.

In addition to the above cited two examples it should be said that this process can be used to great advantage in pelletizing any earthy ores containing a relatively high percentage of fines. Examples of such ores are those currently being mined in Venezuela from the El Pao and Bolivar properties. These ores are both characterized by having a high percentage of fines, and it is necessary now to sinter them prior to use.

With this new procedure, it is now entirely practical, because of the large amounts of either natural gas or oil available in that country, to supply cheaply the heat necessary for the autogenous grinding and also for the pelletizing operation. Sintering of this material at the mine is not desirable because solid carbon is not locally available and also because of the undesirable shipping characteristics of sinter.

This invention is not limited to the use of additives which may or may not be used in the formation of the green balls. For example coke, anthracite fines or char can be used if desired. Similarly, depending on the nature of the material to be balled and the nature of the product wanted, such additives as bentonite, lime, ferrous sulphate, sodium chloride, calcium chloride can be used. If desirable, the same procedure may be used in forming a partially or fully fluxed pellet, by incorporating into the pre-balled mix a desired proportion of ground limestone or dolomite or burnt lime. In processing certain ores containing a substantial proportion of colloidal material, no "binder" need be added for facilitating the formation of good green balls or for preventing exfoliation of the balls during induration.

Although the foregoing examples of the use of this process has been on iron ores, the process is not limited to such ores. It may be used to advantage on a variety of metallic and non-metallic materials. It is particularly applicable to the manufacture of cement by those processes in which the ground cement raw materials are formed into balls and then are fired on a combination traveling grate and rotary kiln machine. Balls made by my process of dry grinding with incremental moisture additions for ball formation are much less plastic and will deform to a lesser degree than balls produced by the conventional methods. This permits more uniform firing and consequently a superior product.

I claim:

1. Process of pelletizing finely divided essentially nonmagnetic earthy iron ore materials, containing substantially more than 6% moisture, which comprises drying and dry grinding the earthy iron ore material until the moisture content of the material is substantially not more than about 4% and until the particle size of the material is reduced in size to the extent of all minus 6 mesh and 40% minus 325 mesh; initially homogenously moistening the resulting finely divided material to a moisture content, varying between about 4 and about 6% by weight, insufficient to effect balling; introducing into a balling device a feed consisting of said insufficiently moistened finely divided material together with undersized balls, of the same earthy iron ore material, whose surfaces are wet with water; passing the resulting mixture through the balling device whereby some of the insufficiently moist finely divided earthy iron ore material adheres to the water-wet surfaces of the undersized balls and becomes compacted thereto; screening out undersized balls and moistening their surfaces with water and returning them to the feed as the aforesaid water-wet undersized balls; and repeating the return of the water-wet undersized balls to the feed a plurality of times until the balls have grown to pre-determined size and have acquired an average moisture content of from about 8.0 to about 11.9% by weight.

2. Process of pelletizing finely divided essentially non-magnetic earthy iron ore materials, containing substantially more than 6% moisture, which comprises drying and dry grinding the earthy iron ore material in an autogenous grinding mill while passing through the mill a current of drying air, the treatment being continued until the moisture content of the material does not exceed about 4% and until the particles of material have been reduced in size to the extent of all minus 6 mesh and 40% minus 325 mesh; initially homogenously moistening the resulting finely ground material to a moisture content, varying between about 4 and about 6% by weight, insufficient to effect balling; introducing into a balling device a feed consisting of said insufficiently moist finely ground earthy iron ore material, together with undersized balls, of the same iron ore material, whose surfaces are wet with water; passing the resulting mixture through the balling device whereby some of the insufficiently moist finely divided earthy iron ore material adheres to the water-wet surfaces and the undersized balls and becomes compacted thereto; screening out undersized balls and moistening their surfaces with water and returning them to the feed as the aforesaid water-wet undersized balls; and repeating the return of the undersized balls to the feed a plurality of times until the balls have grown to pre-determined size and have acquired an average moisture content of from about 8.0 to about 11.9% by weight.

3. Process of pelletizing essentially non-magnetic earthy material, containing substantially more than 6% moisture, which cannot be pelletized by wet grinding and balling, which comprises drying and dry grinding the earthy material until the moisture content does not substantially exceed about 4% and until the particle size of the material is reduced in size to the extent of all minus 6 mesh and 40% minus 325 mesh; initially homogeneously moistening the resulting ground material to a moisture content, varying between about 4 and about 6% by weight, insufficient to effect balling; introducing into a balling device a feed consisting of said insufficiently moistened ground material together with undersized balls, of the same earthy material, whose surfaces are wet with water; passing the resulting feed through the balling device whereby some of the insufficiently moist ground earthy material adheres to the water-wet surfaces of the undersized balls and becomes compacted thereto; screening out undersized balls from the material discharged from the balling device and moistening their surfaces with water and returning them to the feed as the aforesaid water-wet undersized balls; and repeating the return of the water-wet undersized balls to the feed until the balls have grown to pre-determined size and have acquired an average moisture content of from about 8.0 to about 11.9% by weight.

4. Process of pelletizing essentially non-magnetic earthy iron ore materials of relatively coarse structure, said iron ore materials being selected from the group consisting of earthy hematites, limonites and goethites containing so much natural moisture that they cannot be pelletized in their natural state, which comprises substantially drying and dry grinding the earthy iron ore material until the particle size of the material is reduced in size to the extent that it can be balled by a balling device; initialy homogeneously moistening the resulting ground material with an amount of water sufficient only to control the dustiness of the ground material and insufficient to effect balling; introducing into a balling device a feed consisting of said insufficiently moistened ground material together with undersized balls, of the same earthy material, whose surfaces are wet with water; passing the resulting feed through the balling device whereby some of the insufficiently moist ground earthy material adheres to the water-set surfaces of the undersized balls and becomes compacted thereto; screening out undersized balls from the material discharged from the balling device and moistening their surfaces with water and returning them to the feed as the aforesaid water-wet undersized balls; repeating the return of the water-wet undersized balls to the feed until the balls have grown to pre-determined size; and subjecting the balled product to thermal induration treatment.

References Cited by the Examiner

UNITED STATES PATENTS

| | | | |
|---|---|---|---|
| 1,957,314 | 5/1934 | Billings et al. | 75—3 |
| 2,052,329 | 8/1936 | Wendeborn | 75—3 |
| 2,127,632 | 8/1938 | Najarian | 75—3 |
| 2,543,898 | 3/1951 | De Vaney | 75—3 |
| 2,750,273 | 6/1956 | Lellep | 75—3 |

HYLAND BIZOT, *Primary Examiner.*

BENJAMIN HENKIN, *Examiner.*